(12) United States Patent
Wiley (10) Patent No.: US 8,363,552 B2
(45) Date of Patent: Jan. 29, 2013

(54) TRAFFIC ALLOCATION

(75) Inventor: Marshall D. Wiley, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 133 days.

(21) Appl. No.: 12/333,791

(22) Filed: Dec. 12, 2008

(65) Prior Publication Data
US 2010/0149987 A1 Jun. 17, 2010

(51) Int. Cl.
*H04L 1/00* (2006.01)
(52) U.S. Cl. ........................................ 370/237
(58) Field of Classification Search .................. None
See application file for complete search history.

(56) References Cited

U.S. PATENT DOCUMENTS

| | | | |
|---|---|---|---|
| 5,590,188 A | 12/1996 | Crockett | |
| 2002/0065063 A1 | 5/2002 | Uhlik et al. | |
| 2002/0103899 A1* | 8/2002 | Hogan et al. | 709/224 |
| 2003/0210649 A1* | 11/2003 | Bondi | 370/229 |
| 2004/0190497 A1* | 9/2004 | Knox | 370/352 |
| 2004/0248563 A1* | 12/2004 | Ayers et al. | 455/417 |
| 2005/0131748 A1 | 6/2005 | Parker | |

FOREIGN PATENT DOCUMENTS

| | | |
|---|---|---|
| EP | 0122937 | 5/1984 |
| EP | 1073249 | 1/2001 |
| EP | 1876787 | 1/2008 |

OTHER PUBLICATIONS

B. Raghavan et al. "Cloud Control with Distributed Rate Limiting", SIGCOMM, Aug. 27-31, 2007, 12 pages.

* cited by examiner

*Primary Examiner* — Jianye Wu (57) ABSTRACT

A method may include storing rules associated with processing calls. Each of the rules may include a maximum number of calls per unit of time. The method may also include determining whether the maximum number of calls per unit of time associated with a first one of the rules is greater than a threshold. The method may further include allocating by a first node, when the maximum number of calls per unit of time is greater than the threshold, a number of calls per unit of time to the first node based on the number of calls satisfying the first rule that were received by the first node and a total number of calls satisfying the first rule that were received by all of the nodes.

25 Claims, 5 Drawing Sheets

TRAFFIC ALLOCATION

BACKGROUND INFORMATION

Processing and routing data, calls, etc., in a network has become increasingly complex due to increased overall traffic. In addition, destination locations, such as call centers, are often overloaded with calls at various times. This may lead to congestion-related problems at the destination locations and/or congestion-related problems in the overall network.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to processing calls. In an exemplary implementation, a call processing node may measure the traffic volume it receives that satisfies a particular rule or criteria over a period of time. The call processing node may communicate with other call processing nodes in a network to determine the overall amount of traffic being processed in the network that satisfies the particular rule or criteria over the period of time. The call processing node may then allocate to itself a share of the maximum amount of traffic for that rule based on the proportion or percentage of the overall traffic it handled for that rule during the measured period of time. The traffic allocation associated with each node may be updated in a dynamic manner as new traffic is processed. In some implementations, traffic allocation associated with a low volume rule (e.g., a rule with a relatively low number of maximum calls allowed per unit of time) may be determined by a centralized device/system. The call processing node may limit the number of call requests that it sends to the centralized device based on the maximum number of calls allowed for that rule. The centralized device/system may receive requests from a number of call processing nodes and signal the nodes to allow or block the calls.

Figure 1:
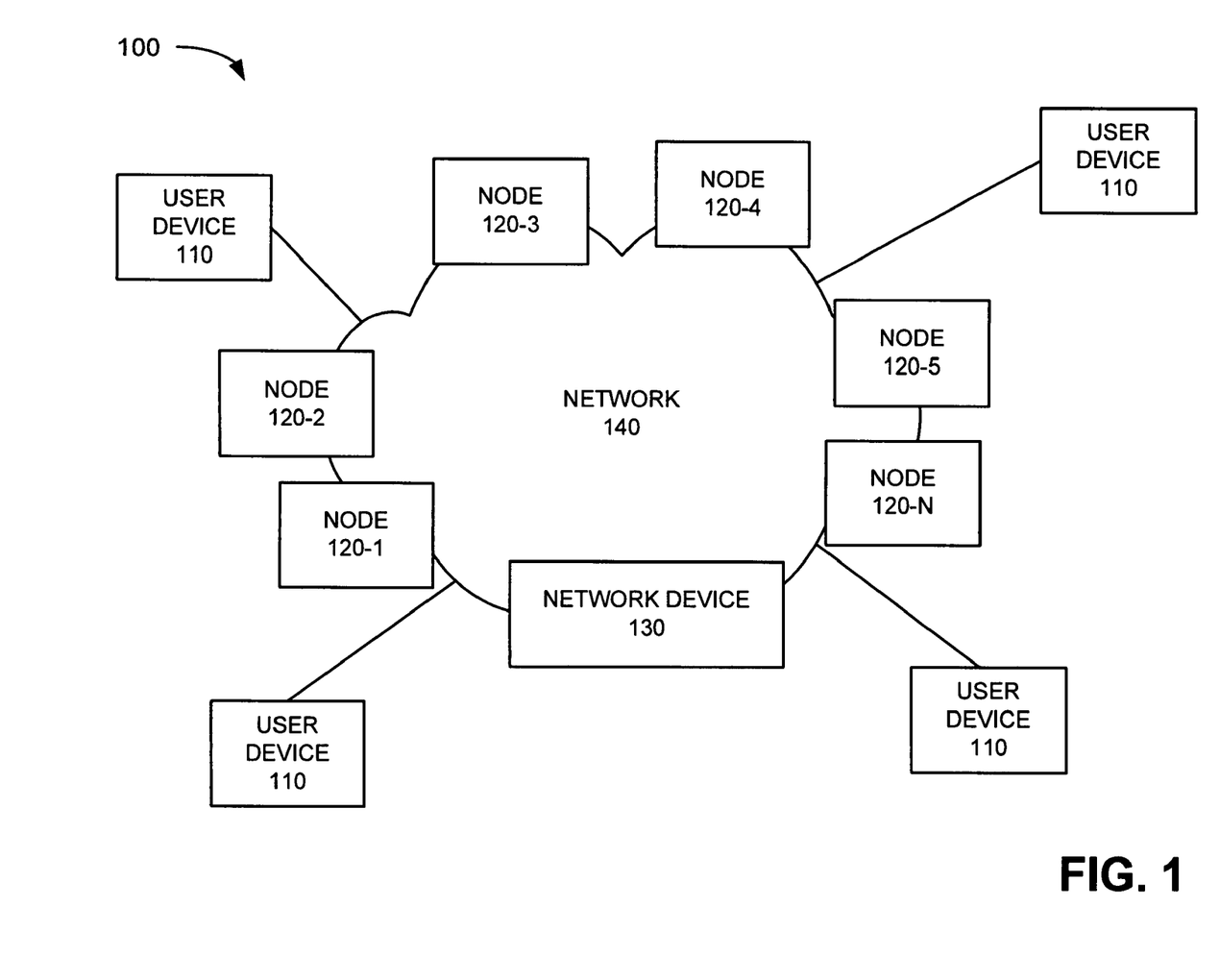
FIG. 1 illustrates an exemplary network in which systems and methods described herein may be implemented.

FIG. 1 is a block diagram of an exemplary network 100 in which systems and methods described herein may be implemented. Network 100 may include user devices 110, nodes 120-1 through 120-N, referred to individually as node 120 or node 120-N (where N represents any integer value) and collectively as nodes 120. Network 100 may also include network device 130 and network 140.

Each of user devices 110 may include any device or combination of devices capable of transmitting voice signals and/or data to a network, such as network 140. In one implementation, user devices 110 may include any type of telephone system/device, such as a plain old telephone system (POTS) telephone, a voice over Internet protocol (VoIP) telephone (e.g., a session initiation protocol (SIP) telephone), a wireless or cellular telephone device (e.g., a personal communications system (PCS) terminal that may combine a cellular radiotelephone with data processing and data communications capabilities, a personal digital assistant (PDA) that can include a radiotelephone, or the like), etc. In another implementation, user devices 110 may include any type of computer system, such as a personal computer (PC), a laptop, PDA or the like that can make, for example, a VoIP call. User devices 110 may connect to network 140 via any conventional technique, such as wired, wireless, or optical connections.

Each of nodes 120, also referred to herein as call processing nodes 120, may represent a network device that is able to process received calls, make switching or routing decisions and forward the calls on toward their respective destinations. In some implementations, some of nodes 120 may be designed to handle PSTN calls and other ones of nodes 120 may be designed to handle VoIP calls. In other implementations, nodes 120 may handle both PSTN calls and VoIP calls. In an exemplary implementation, each of nodes 120 may communication with other nodes 120 and network device 130 to balance traffic in network 100, as described in detail below.

Network device 130 may include one or more computing devices, such as one or more servers, call processing nodes, etc., used to receive call-related information from other devices in network 100. For example, network device 130 may receive call information from the call processing nodes 120, as described in detail below.

Network 140 may include one or more wired and/or wireless networks that are capable of receiving and transmitting data, voice and/or video signals, including multimedia signals that include voice, data and video information. For example, network 140 may include one or more public switched telephone networks (PSTNs) or other type of switched network. Network 140 may also include one or more wireless networks and may include a number of transmission towers for receiving wireless signals and forwarding the wireless signals toward the intended destination. Network 140 may further include one or more packet switched networks, such as an Internet protocol (IP) based network, a local area network (LAN), a wide area network (WAN), a personal area network (PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, network 100 may include additional elements, such as switches, gateways, routers, etc., that aid in routing traffic, such as telephone calls, from user devices 110 to their respective destinations in network 100. In addition, in some implementations, nodes 120 may be grouped in network platforms. For example, in one implementation, three networking platforms may be included in network 100, with each platform including seven call processing nodes 120. Further, call processing nodes 120 and network device 130 are shown as separate devices. In other implementations, the functions performed by one or more of nodes 120 and network device 130 may be performed by a single device. For example, in some implementations, the functions described as being performed by network device 130 may be performed by one or more of nodes 120.

As described briefly above, each of nodes 120 may communicate with other nodes 120 and network device 130 to balance traffic in network 100. For example, each of nodes 120 may include a peer-to-peer daemon and an application programming interface (API) that allows a node 120 to communicate with other nodes 120 and network device 130 to balance traffic in network 100. In an exemplary implementation, each node 120 may analyze calls that it processes, such as an amount of traffic associated with a given call record or rule. A call record may correspond to a rule which indicates that for a given origination/originating number and/or termination/terminating number, only N calls per unit of time are permitted and that calls exceeding N calls per unit of time should be blocked or dropped. The origination associated with a call record or rule may include, for example, a single telephone number, a range of telephone numbers, telephone numbers associated with a particular area code, etc. In addition, the origination may include an IP address or range of IP addresses associated with VoIP calls. The termination associated with a call record or rule may include one or more telephone numbers or IP addresses, a range of telephone numbers or IP addresses or any other numbers/IP addresses associated with a particular destination. For example, the termination may correspond to a call center that processes calls for a business or other entity.

Each of nodes 120 may allocate a portion of the allowed calls associated with each call record or rule to balance call traffic. In an exemplary implementation, each of nodes 120 communicates with other nodes 120 in network 100 in a peer-to-peer fashion to share call processing information to balance the overall load associated with a call record or rule across all call processing nodes 120 in network 100, as described in detail below.

Figure 2:
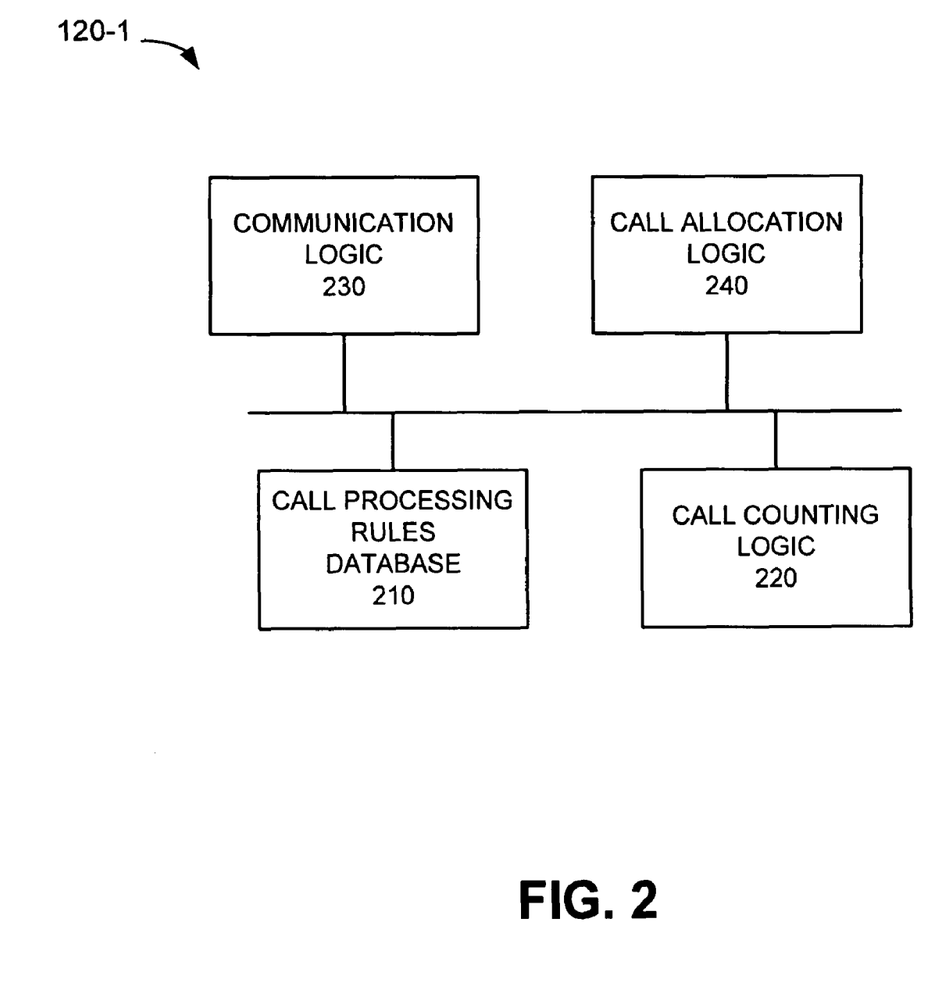
FIG. 2 illustrates an exemplary configuration of logic components implemented in the nodes of FIG. 1.

FIG. 2 illustrates an exemplary configuration of node 120-1. Each of the other nodes 120 in network 100 may be configured in a similar manner. Referring to FIG. 2, node 120-1 may include call processing rules database 210, call counting logic 220, communication logic 230 and call allocation logic 240. The exemplary configuration illustrated in FIG. 2 is provided for simplicity. It should be understood that node 120-1 may include more or fewer logic devices than illustrated in FIG. 2. For example, node 120-1 may include additional elements, such as servers, switches, gateways, routers, etc., that aid in routing calls.

Call processing rules database 210 may store rules that apply to processing calls from user devices 110. For example, one call processing rule may indicate that for a given origination, only N calls per second (CPS) are permitted. The origination may correspond to a particular originating number that is using an auto-dialer or robodialer to generate an abnormally high number of calls. In other instances, the given originating number for a rule may correspond to a range of numbers and/or IP addresses, telephone numbers from a particular area code, etc. Another rule in call processing rules database 210 may indicate that one or more terminating telephone numbers associated with a call center are to receive a maximum of M calls per second. This number M may be based on the desired wait time for the call center. Calls exceeding the maximum number of calls per second are to be blocked.

Call counting logic 220 may include logic that is able to receive and process call-related information, such as calls received by node 120-1, as well as call information from each of the other nodes 120 in network 100. In an exemplary implementation, call counting logic 220 may gather or break down the statistics on a per-rule, per-node basis. That is, call counting logic 220 may generate call processing data for each rule stored in call processing rules database 210 with respect to each node 120 handling calls that satisfy the particular rule.

Communication logic 230 may include logic that allows node 120 to communication with other nodes 120 and network device 130. In an exemplary implementation, communication logic 230 may include a peer-to-peer daemon that allows node 120 to communicate with other nodes 120 in a peer-to-peer fashion. The information received by communication logic 230 may include information identifying calls that have recently been received by each node 120 in network 100 and that satisfy a particular rule. Communication logic 230 may also forward similar information for calls that it receives to other nodes 120 in network 100. Communication logic 230 may further include a daemon or software that allows node 120-1 to communicate with network device 130 to request approval for processing calls, as described in detail below.

Call allocation logic 240 may include logic that receives data from call counting logic 220 and communication logic 230 (e.g., information from other nodes 120) and allocates a share of allowed calls on a per-rule basis to node 120-1. For example, in one implementation, the number of calls allocated to each node 120 may be proportional to the number or percentage of calls that each node 120 has received that satisfy a particular rule. Call allocation logic 240 may dynamically reallocate the call traffic for each rule at various intervals, as described in detail below.

In an exemplary implementation, call counting logic 220, communication logic 230 and call allocation logic 240 may include one or more processors, microprocessors or other processing logic used to interpret and execute instructions. In such implementations, call counting logic 220, communication logic 230 and call allocation logic 240 may include software instructions stored in a computer-readable medium. A computer-readable medium may be defined as one or more memory devices. The software instructions may be read into memory from another computer-readable medium or from another device via a communication interface. The software instructions contained in memory may cause the various logic components, such as call counting logic 220, communication logic 230 and call allocation logic 240, to perform processes that are described below. Alternatively, hardwired circuitry may be used in place of or in combination with software instructions to implement processes consistent with the exemplary embodiments. Thus, systems and methods described herein are not limited to any specific combination of hardware circuitry and software.

Figure 3:
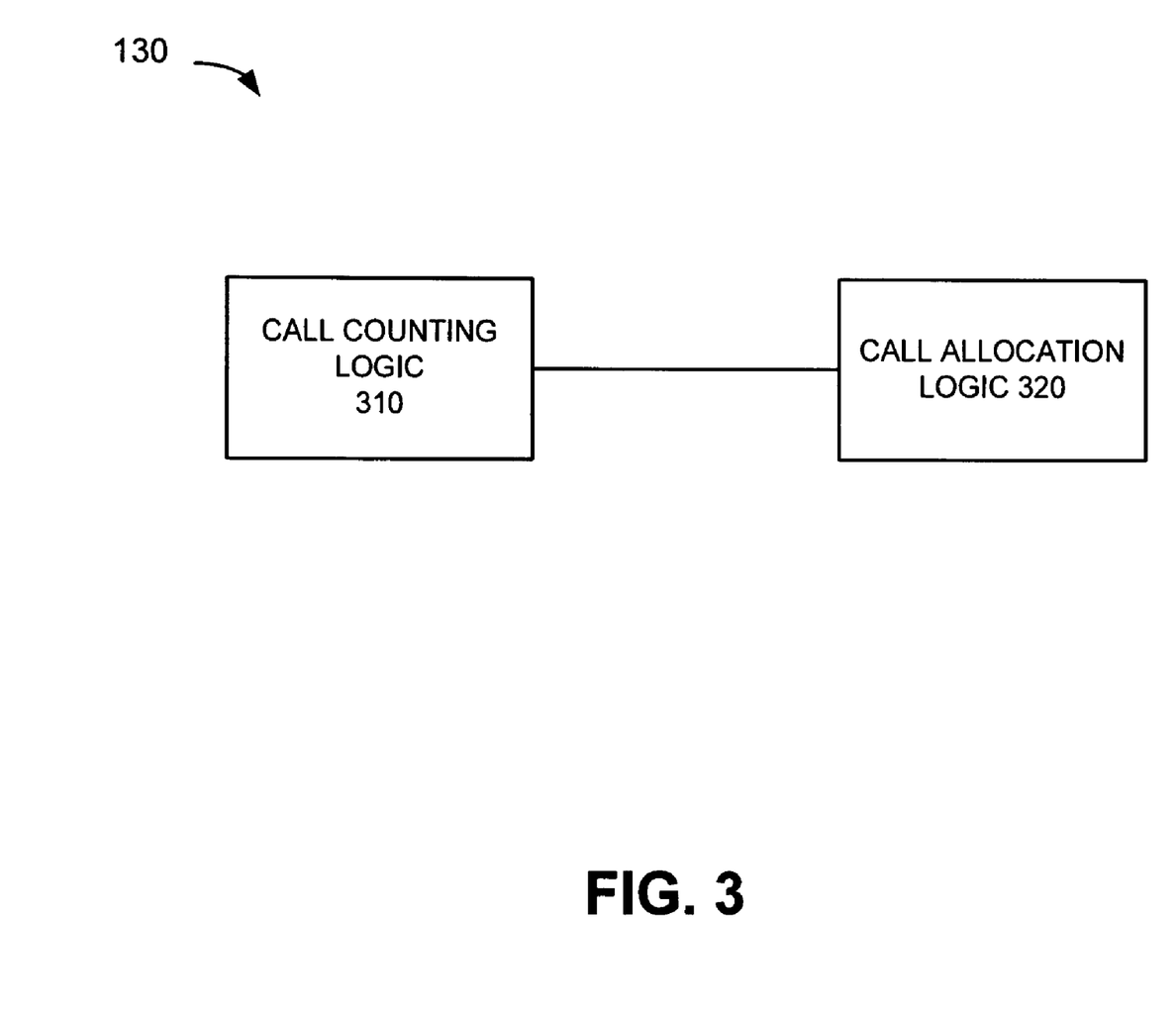
FIG. 3 illustrates an exemplary configuration of logic components implemented in the network device of FIG. 1.

FIG. 3 illustrates an exemplary configuration of network device 130. Referring to FIG. 3, network device 130 may include call counting logic 310 and call allocation logic 320. The exemplary configuration illustrated in FIG. 3 is provided for simplicity. It should be understood that network device 130 may include more or fewer devices than illustrated in FIG. 3. For example, network device 130 may include a communication interface that allows network device 130 to communicate with other devices in network 100, such as nodes 120.

Call counting logic 310 may include or more processors, microprocessors or other processing logic that is able to receive and process call-related information, such as call queries, from each of nodes 120. The information received by call counting logic 310 may include information identifying calls that have recently been received by each node 120 in network 100 that satisfy a particular rule.

Call allocation logic 320 may include one or more processors, microprocessors or other processing logic that receives data from call counting logic 310 and determines whether to allow calls or block calls received by nodes 120 in network 100. In an exemplary implementation, call allocation logic 320 may then provide an indication to nodes 120 in network 100 as to whether to allow or block/drop calls, as described in detail below.

Figure 4:
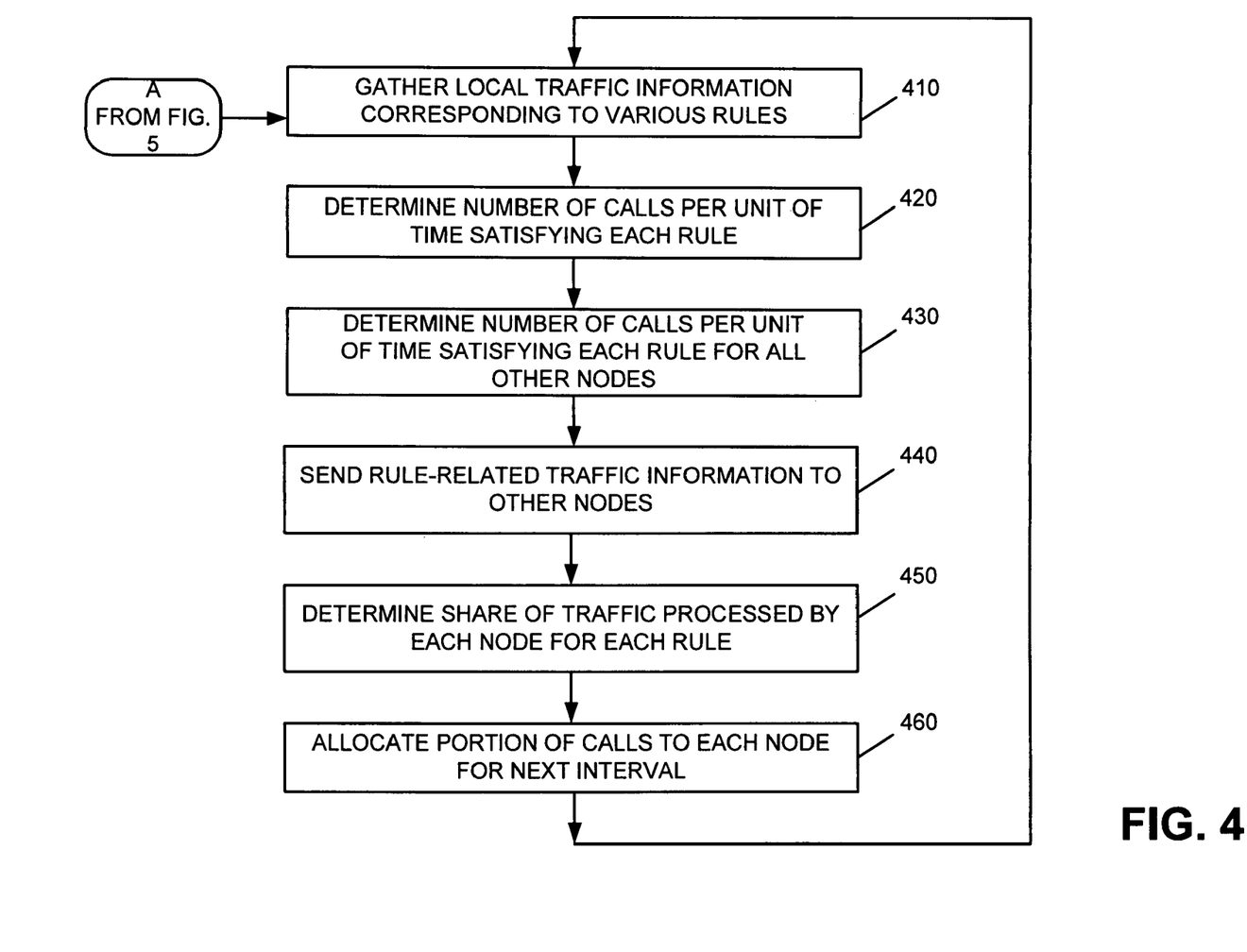
FIG. 4 is a flow diagram illustrating exemplary processing by various devices illustrated in FIG. 1.

FIG. 4 is a flow diagram illustrating exemplary processing associated with balancing the call traffic in network 100. Processing may begin with each of nodes 120 handling traffic, such as telephone calls that include both PSTN calls and VoIP calls. As discussed above, each of nodes 120 may handle calls that are relevant to various call processing rules stored in call processing rules database 210. It should be understood that each of network nodes 120 may also handle calls to which no rule applies.

As a node 120, such as node 120-1, is processing calls, call counting logic 220 may identify the number of calls that node 120 is handling that pertain to various rules stored in call processing rules database 210 (act 410). For example, call counting logic 220 may gather or identify local traffic information associated with calls that pertain to each particular rule stored in call processing rules database 210. In an exemplary implementation, call counting logic 220 may identify the number of calls handled by node 120-1 that satisfy each particular rule stored in call processing rules database 210 over a number of intervals of time (act 420). For example, in one implementation, call counting logic 220 may determine the number of calls processed by node 120-1 that satisfy or meet the criteria of a particular rule stored in call processing rules database 210 during each of five 200 millisecond (ms) intervals. Determining the number of calls over short intervals, such as 200 ms intervals, may improve accuracy with respect to determining the number of calls per unit of time, as the relative levels of traffic during a calling event that generates a large number of calls may be statistically stable for very short periods.

Assume that one rule is associated with a call center that wants to accept a maximum of 100 calls per second (CPS). In this case, call counting logic 220 may access call processing rules database 210 and identify the telephone number or numbers associated with that particular call center. Further assume that the call counting logic 220 determines that the number of calls satisfying the rule associated with the call center during each of the five 200 ms intervals is 20, 18, 21, 22 and 19, respectively. In this case, call counting logic 220 determines that 100 calls satisfying the rule were received over the one second sampling period (i.e., 100 CPS).

Call counting logic 220 and/or call allocation logic 240 may also track traffic for each of the other nodes 120 in network 100. For example, as described above, each node 120 may include a peer-to-peer daemon or software code that enables a node, such as node 120-1, to communicate with other nodes 120. In one implementation, each node 120 may periodically broadcast current counts of calls satisfying each rule stored in call processing rules database 210 to the other nodes 120 in network 100. In an exemplary implementation, each node 120 may broadcast this information every 200 ms. Node 120-1 may receive this information from the other nodes 120 and determine the number of calls satisfying each rule that are being processed by the other nodes 120 (act 430). In another exemplary implementation, node 120-1 may query the other nodes 120 for this information periodically, such as every 200 ms. In each case, call counting logic 220 (or call allocation logic 240) may then determine the total number of calls that were received by all the other nodes 120 in network 100 that satisfy the particular rule per unit of time, such as one second (act 430).

The other nodes 120 may perform similar calculations regarding call traffic. That is, each of nodes 120 may share statistical information generated by its respective call counting logic 220. For example, communication logic 230 of node 120-1 may broadcast call counting information, generated by call counting logic 220 in node 120-1, to each other node 120 in network 100 (act 440). Similarly, call counting logic 220 in each of the other nodes 120 in network 100 may send data from its respective call counting logic 220 to the other nodes 120 in network 100. In this manner, call allocation logic 240 in each node 120 will have access to network-wide information regarding calls that satisfy each rule that are processed by each node 120.

Now assume that the rule associated with the particular call center indicates that calls sent to the call center should be limited to 100 CPS. Call allocation logic 240 in each of nodes 120 may then determine a share of the allowed 100 CPS to allocate to its respective node 120. For example, suppose that network 100 includes 10 nodes 120, and that node 120-1 has received 100 calls over the most recent one second period (i.e., five 200 ms intervals). Further assume that each of nodes 120-2 through 120-10 received 10 calls satisfying the rule associated with the call center over the most recent one second interval.

In an exemplary implementation, call allocation logic 240 may then determine the portion of calls or percentage of calls that node 120-1 has received that satisfy the rule with respect to all calls in network 100 that satisfy the rule (act 450). In this example, call allocation logic 240 determines that node 120-1 received 100 calls and that the other nine nodes 120 combined received 90 calls that satisfy the rule (i.e., 10 calls from each of the nine nodes). Therefore, in this example, all of the nodes 120 in network 100 received 190 calls that satisfy the rule for the call center in the most recent one second interval. Call allocation logic 240 may then determine that node 120-1 received approximately 52.6% (i.e., 100/190) of the total call volume satisfying the rule.

Call allocation logic 240 may then allocate a share of the total allowed CPS for the call center rule to node 120-1 for the next interval based on the proportion of calls satisfying the rule that were handled by node 120-1 during the previous interval (act 460). For example, in this case, call allocation logic 240 may allocate 52.6% of the total allowed 100 CPS to node 120-1. In this example, 52.6% of the total calls would be 52.6 CPS. In some implementations, call allocation logic 240 may round down this number to 52 to ensure that the total CPS from all nodes 120 does not exceed the allowed amount. In other implementations, call allocation logic 240 may round the number to the nearest whole number (i.e., 53 in this example). Call allocation logic 240 in each of the other nodes (i.e., nodes 120-2 through 120-10) may perform a similar calculation for allocating calls to its respective node 120 (acts 450 and 460). In the scenario described above, each of nodes 120-2 through 120-10 handled approximately 5.26% of the total calls (i.e., 10/190) satisfying the rule. Call allocation logic 240 in each of nodes 120-2 through 120-10 may then allocate five calls (i.e., approximately 5.26% of 100 CPS) to its respective node 120 during the subsequent one second interval. In alternative implementations, call allocation logic 240 may round up the actual 5.26 value and allocate six calls per second to each of nodes 120-2 through 120-10 for the subsequent one second interval. In either case, call allocation logic 240 in each of nodes 120-2 to 120-10 may control its respective node 120 to accept no more than its allocated number of calls during that particular interval.

In this manner, each node 120 is allocated a proportional or prorated share of traffic based on an amount of traffic it handled that satisfied the rule during a previous interval. In some implementations, call counting logic 220 may forward the statistical information to the other nodes 120 at each interval during which it obtains measurements (e.g., every 200 ms). In other instances, call counting logic 220 may forward statistical information to the other nodes 120 at other intervals, such as every second.

Processing may continue in this manner at each of nodes 120. During each interval (e.g., every one second or less), call allocation 240 included in each node 120 may dynamically provide new allocations for its respective node 120 for each rule. In the manner described above, nodes 120 act in a peer-to-peer manner to distribute traffic in network 100 in a relatively "fair" manner. That is, each node 120 is given a fair chance of forwarding traffic associated with a particular rule based on the number of calls satisfying the rule that were processed by that node 120 during a previous interval of time.

For example, assume that a call center associated with taking calls for a reality television show receives 10 CPS from each of 12 nodes 120 handling VoIP calls and 990 CPS from each of nine nodes 120 handling PSTN calls. In this case, each of the VoIP nodes 120 is given a fair chance of forwarding calls based on the volume of calls handled during the preceding interval. In this example, each of the VoIP nodes 120 will be allocated approximately 0.11% (i.e., 10/9030) of the total number of calls for that rule and each of the PSTN nodes 120 will be allocated approximately 11.0% (i.e., 990/9030) of the total number of calls for that rule. Therefore, VoIP callers will be given the same percentage chance as PSTN callers based on the prorated share of calls satisfying the rule that were handled by each respective node.

In addition, network 100 may quickly adapt to a changing number of call processing nodes 120. For example, if ten call processing nodes 120 are processing data and one call processing node 120 fails or is taken offline for routine maintenance, each of nodes 120 will adapt to having only nine call processing nodes 120 in network 100. That is, each node 120 may receive no data from the offline node 120 and will allocate traffic based on the percentage of traffic it handles that satisfy the various rules. In such situations, the loss of a call processing node 120 may be transparent or not affect the allocation processing at the other network nodes 120.

As described above, each of nodes 120 may perform its own calculations regarding identifying local traffic satisfying various rules to allocate traffic. In this manner, the overall computation load associated with allocating traffic in network 100 is handled in a distributed manner. That is, each node 120 performs its own computations independently of other network platforms. However, each node 120 also shares data with the nodes 120 to allow each node 120 to have overall traffic information in network 100 at any given time.

In some instances, a node 120 may not process any calls satisfying a particular rule during a particular interval of time. In such instances, that node 120 may be allocated zero calls satisfying the rule for the subsequent interval of time. However, in some implementations, in situations in which a particular node 120 has received no calls satisfying a particular rule during a particular interval of time, that node 120 may be allocated some nominal number of calls for that rule for the subsequent interval, as opposed to allocating zero calls to that node 120.

In addition, in some situations, the total number of calls that were received during a particular interval of time that satisfied a particular rule may be less that the maximum number of allowed calls for that rule. In some implementations, nodes 120 may permit all calls to be forwarded during that interval and/or subsequent interval of time, regardless of the number of calls allocated for each node 120 during that interval. In such instances, nodes 120 may communicate with each other and determine that the total number of received calls associated with a rule is less than the allowed number of calls. Each of nodes 120 may then forward all calls satisfying the rule to their destination during the subsequent interval of time.

Figure 5:
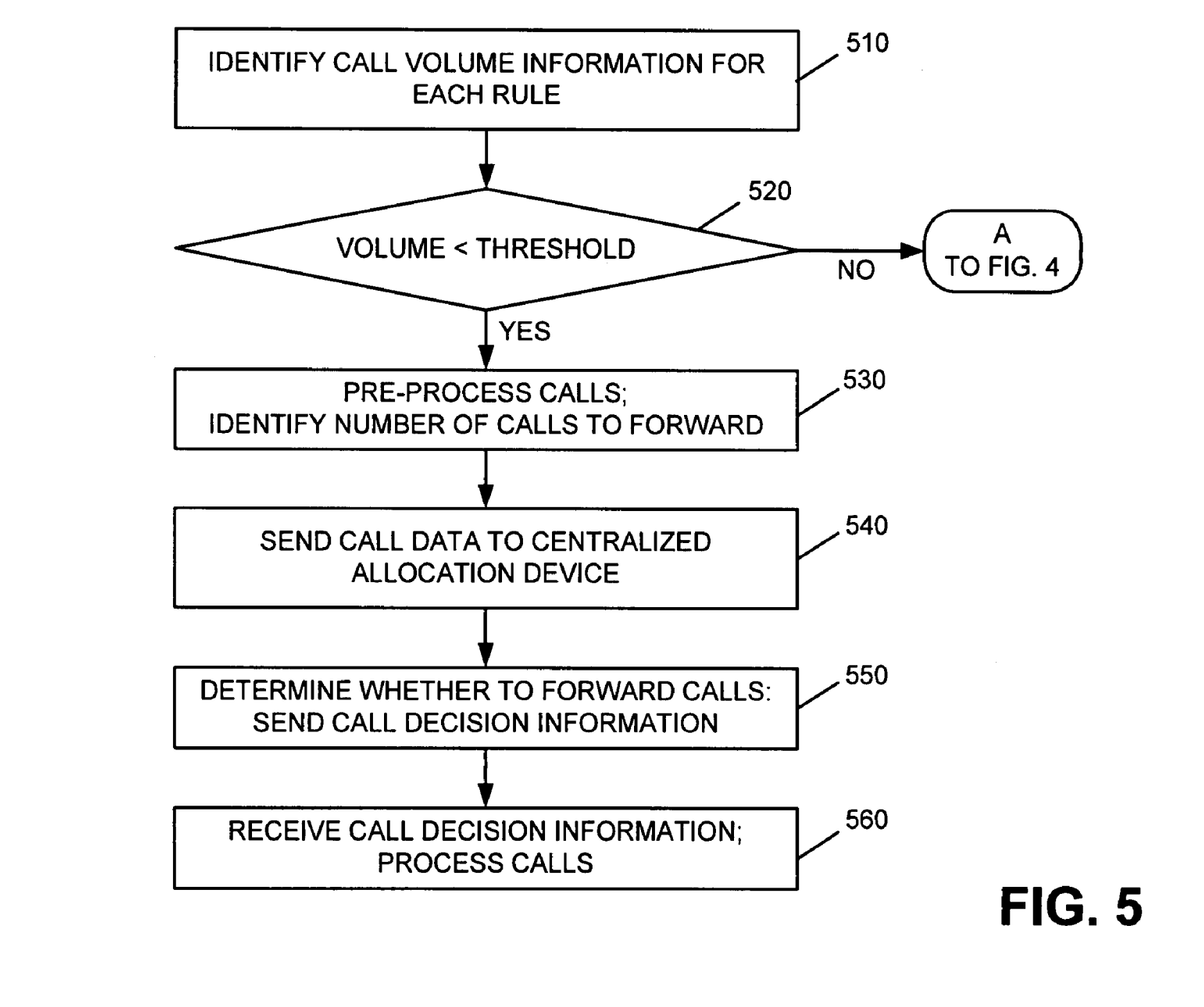
FIG. 5 is a flow diagram illustrating exemplary processing by various devices illustrated in FIG. 1 in another implementation.

In some implementations, such as for low volume rules in which the total allowed calls per unit of time is relatively low, such as less than 100 CPS, the error rate associated with handling calls may be greater than desired. That is, the likelihood of not blocking a call that should be blocked or blocking a call that should not be blocked increases, as compared to high volume rules. In such instances, more precise counting may be used, as described in detail below FIG. 5 illustrates exemplary processing associated with processing calls in another implementation. Processing may begin with call allocation logic 240 in each of nodes 120, such as node 120-1, analyzing each of the rules in call processing rules database 210 and identifying call volume information for each rule (act 510). Call allocation logic 240 may identify whether a particular rule has a call volume (e.g., a maximum CPS value) that is less than a threshold value (act 520). If the volume is not less than the threshold value, (act 520—no), call processing and allocation of a portion of the total allowed number of calls to each of nodes 120 may proceed as described above with respect to FIG. 4.

If, however, the volume is less than the threshold, (act 520—yes), a centralized counting process may be triggered. For example, assume that the threshold for triggering centralized counting is 100 CPS. Further assume that a particular rule stored in call processing rules database 210 is associated with limiting the number of calls from a particular area code to 50 CPS. In this case, call allocation logic 240 may determine that the call volume for the area code rule is less than the threshold (act 520—yes).

Call allocation logic 240 may then pre-process calls that satisfy the particular rule to determine the number of call requests that it can forward to network device 130 (act 530). For example, assume that network 100 includes ten nodes 120 that are receiving a combined 1000 CPS that satisfy the rule that has a maximum allowed 50 CPS. Further assume that the total traffic is distributed evenly with each of the ten nodes 120 receiving 100 CPS that satisfy the rule. Call allocation logic 240 may then calculate its share of the total 50 CPS rule in a similar manner as that described above with respect to FIG. 4. In this example, call allocation logic 240 will determine that it is allocated 10% (i.e., 100/1000) of the total 50 CPS for a value of five CPS. In some implementation, call allocation logic 240 may then determine that it can send five call queries to network device 130. However, in an exemplary implementation, each node 120 may forward more than five CPS to network device 130 to ensure that the full 50 CPS are actually forwarded.

For example, each node 120 may adjust the calculated local traffic it may send (i.e., five CPS in this example) to network device 130 to ensure that enough calls are sent to network device 130, while also not overloading network device 130. As an example, call allocation logic 240, may add some fixed offset or constant value to the initially calculated value. Continuing with the example above, call allocation logic 240 may add, for example, two additional calls to the originally calculated five CPS value, for a total of seven CPS to forward to network device 130. In some implementations, the offset may be based on the number of initially calculated calls, such as a percentage of the initially calculated value. In other instances, the offset may be fixed based on the initially calculated value. As an example, for calculated values of less than ten CPS, two additional CPS may be added, but for calculated values of 20 CPS, five additional CPS may be added.

Continuing with the example above, node 120-1, which received 100 CPS satisfying the rule, will forward queries associated with seven CPS to network device 130 and drop 93 calls (act 540). Similarly, each other node 120 may drop 93 of the 100 CPS and forward seven CPS to network device 130 (act 540). Therefore, in this example, network device 130 may receive 70 CPS for the 50 CPS rule.

Call counting logic 310 (FIG. 3) may receive the call-related information from call allocation logic 240 in node 120-1. Call counting logic 310 may also receive call-related data for this particular rule from call allocation logic 240 in the other nodes 120 in network 100 in a similar manner. Call counting logic 310 may determine the total number of calls currently being processed that satisfy the rule and forward this information to call allocation logic 320. Call allocation logic 320 may then determine whether to approve the received calls (act 550).

For example, in one implementation, call allocation logic 320 may allocate calls to nodes 120 on a first come, first served basis. That is, if a rule has a 50 CPS limit, the first 50 calls received by network device 130 during each interval for that rule will be approved by call allocation logic 320. Call allocation logic 320 may forward the call allocation decision associated with each approved call to the appropriate node 120 (act 550). Call allocation logic 320 may also send a drop or block indication for the call requests that exceed the allowed 50 CPS (act 550).

Call allocation logic 240 in node 120 may receive the call approval/non-approval indication and process or drop the call based on the received information (act 560). Processing may continue in this manner with network device 130 functioning as a centralized allocation system to distribute calls across nodes 120 in network 100. In this manner, when calls satisfying a particular low volume rule are received, node 120 pre-processes the calls to limit the number of calls forwarded to network device 130 for approval. This ensures that network device 130 is not overloaded by requests from nodes 120. Network device 130 may then simply approve or disapprove the calls based on, for example, a first come, first served basis.

As discussed above with respect to FIG. 4, in some instances, a node 120 may not process any calls satisfying a particular rule during a particular interval of time. In such instances, that node 120 may perform pre-processing and determine that zero calls associated with the first rule should be forwarded to network device 130. In this case, the offset value ensures that each node 120 will be able to forward some nominal number of calls to network device 130 for that rule.

In addition, similar to the discussion above with respect to FIG. 4, in some situations, the total number of calls that were received during a particular interval of time that satisfied a particular rule may be less that the maximum number of allowed calls for that rule. In some implementations, nodes 120 may permit all calls to be forwarded during that interval of time to network device 130, regardless of the number of calls allocated for each node 120 during that interval.

As described above, call counting logic 220 may access call processing rules database 210 to identify rules that may apply to various calls. In some instances, a call may satisfy the criteria associated with more than one rule. In an exemplary implementation, all counting logic 220 may check each rule in call processing rules database 210 with respect to each call to determine whether the call satisfies the rule, even if call allocation logic 240 has already determined that the call may be blocked based on a previous rule in call processing rules database 210. This allows call allocation logic 240 to obtain an accurate count of calls that satisfy the rules in call processing rules database 210 for forwarding to other nodes 120 in network 100.

Implementations described herein provide for routing calls within a network using distributed processing to allocate the call processing load to each of the call processing nodes. In some instances, a centralized processing device/system may be used to aid in processing call requests.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to call allocation for low volume rules being performed by a centralized network device/system. In an alternative implementation, the centralized network device/system may be located at one of nodes 120.

Further, while series of acts have been described with respect to FIGS. 4 and 5, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:

determining a first number of calls, associated with a first rule, that were received by a first one of a plurality of nodes over a first period of time, wherein the first rule includes a maximum call processing rate;

receiving information identifying a second number of calls, associated with the first rule, that were received by other ones of the plurality of nodes over the first period of time;

determining that the maximum call processing rate associated with the first rule is greater than a threshold value;

allocating, by the first node, a portion of the maximum call processing rate associated with the first rule to the first node, based on the first and second numbers of calls, wherein the portion of the maximum call processing rate identifies a number of calls per unit of time associated with the first rule that the first node is allowed to forward;

determining, by the first node, that a second call rate associated with a second rule is less than the threshold value; and forwarding, by the first node, calls received by the first node that satisfy the second rule to a second device configured to determine whether to approve the forwarded calls.

2. The method of claim 1, further comprising:
processing, by the first node, calls satisfying the second rule received over the first period of time;
determining a portion or percentage of a total number of calls that satisfied the second rule during the first period of time that were received by the first node;
calculating a third call rate based on the determined portion or percentage; and
increasing the third call rate to identify a second number of calls to forward to the second device.

3. The method of claim 2, wherein the forwarding calls received by the first node that satisfy the second rule comprises:
forwarding, by the first node, the second number of calls to the second device.

4. The method of claim 3, further comprising:
discarding or dropping, by the first node, calls satisfying the second rule that were received during the first period of time after the second number of calls have been forwarded.

5. The method of claim 2, wherein increasing the third call rate comprises one of adding a constant value to the third call rate or adding a value based on the third call rate.

6. The method of claim 2, further comprising:
forwarding, by the first node, the second number of calls to the second device during the first period of time;
receiving, by the second device, the second number of calls from the first node;
receiving, by the second device, calls from other ones of the plurality of nodes; and
determining, by the second device, whether to allow calls satisfying the second rule to be forwarded by the first node based on a time in which the calls were received by the second device.

7. The method of claim 1, wherein the allocating comprises:
determining a portion or percentage of a total number of calls that satisfied the first rule during the first period of time that were received by the first node, and
calculating a number of calls per unit of time based on the determined portion or percentage.

8. The method of claim 1, further comprising:
determining a portion or percentage of a total number of calls that satisfied the first rule during the first period of time that were received by each of the other ones of plurality of nodes; and
allocating, by each of the other ones of the plurality of nodes, a number of calls per unit of time based on its respective determined portion or percentage.

9. The method of claim 1, further comprising:
forwarding, by the first node, to each of the other ones of the plurality of nodes, information identifying the first number of calls.

10. The method of claim 9, wherein the first period of time comprises a plurality of intervals, the method further comprising:
forwarding at each interval, by the first node, the information identifying the number of calls that satisfied the first rule to each of the other ones of the plurality of nodes; and
receiving at each interval, by the first node, from the other ones of the plurality of nodes, information identifying the number of calls satisfying the first rule that were received by the other ones of the plurality of nodes.

11. The method of claim 1, further comprising:
repeating the determining a first number of calls and receiving information identifying a second number of calls at predetermined intervals for subsequent periods of time; and
modifying the allocation of the portion of the maximum call processing rate to the first node for each subsequent period of time-based on the determined first and second numbers of calls that were received by the first node and the other ones of the plurality of nodes, respectively, during each of the subsequent periods of time.

12. The method of claim 1, further comprising:
accessing, by the first node, a database storing a plurality of rules;
searching, by the first node, all of the rules in the database to identify each rule that applies to a received call; and
calculating a number of calls received by the first node that satisfy each rule stored in the database for each interval of time, where at least some calls may be counted for two or more rules.

13. The method of claim 1, wherein the method is implemented using a non-transitory computer-readable medium.

14. A non-transitory computer-readable medium having stored thereon sequences of instructions which, when executed by at least one processor, cause the at least one processor to:
access a plurality of rules associated with processing calls, each of the plurality of rules including a maximum number of calls per unit of time;
determine whether the maximum number of calls per unit of time associated with a first one of the plurality of rules is greater than a threshold; and
allocating, when the maximum number of calls per unit of time is greater than the threshold, a second number of calls per unit of time to a first node, based on a total number of calls satisfying the first rule that were received by the first node and a total number of calls satisfying the first rule that were received by a plurality of other nodes, wherein the second number of calls per unit of time identifies a number of calls per unit of time associated with the first rule that the first node is allowed to forward.

15. The non-transitory computer-readable medium of claim 14, further including instructions for causing the at least one processor to:
forward, when the maximum number of calls per unit of time associated with the first rule is less than the threshold, calls received by the first node that satisfy the first rule to a second device.

16. The non-transitory computer-readable medium of claim 15, further including instructions for causing the at least one processor to:
determine, when the maximum number of calls per unit of time is less than the threshold, a portion or percentage of a total number of calls that satisfied the first rule during a first period of time that were received by the first node;

calculating a number of calls per unit of time based on the determined portion or percentage; and adding a first value to the calculated number of calls per unit of time to determine a third number of calls to forward to a second device.

17. The non-transitory computer-readable medium of claim 16, further including instructions for causing the at least one processor to:

forward, by the first node, the third number of calls to the second device during the first period of time; and discard or drop calls satisfying the first rule that were received during the first period of time after the third number of calls have been forwarded.

18. The non-transitory computer-readable medium of claim 16, wherein when allocating, the instructions cause the at least one processor to:

determine a portion or percentage of a total number of calls that satisfied the first rule during a first period of time that were received by the first node, and allocate the second number of calls per unit of time based on the determined portion or percentage.

19. The non-transitory computer-readable medium of claim 14, further including instructions for causing the at least one processor to:

forward, by the first node to each of the plurality of other nodes, information identifying the number of calls received during a first period of time that satisfied the first rule; and receive, by the first node from the plurality of other nodes, information identifying the number of calls satisfying the first rule that were received by the plurality of other nodes during the first period of time.

20. A device, comprising:

at least one logic device configured to:

determine a number of calls received by the device over a first period of time that satisfied a first rule, the first rule defining a maximum number of calls per unit of time, determine whether the maximum number of calls per unit of time associated with the first rule is greater than a threshold, receive, from a plurality of other devices, information identifying a second number of calls received by the plurality of other devices over the first period of time that satisfied the first rule, and allocate, when the maximum number of calls per unit of time associated with the first rule is greater than the threshold, a portion of the maximum number of calls per unit of time to the device, based on the number of calls that satisfied the first rule that were received by the device over the first period of time and the second number of calls, wherein the portion of the maximum number of calls per unit of time identifies a number of calls per unit of time associated with the first rule that the device is allowed to forward.

21. The device of claim 20, wherein when allocating, the at least one logic device is configured to:

determine a proportion or percentage of a total number of calls satisfying the first rule that were received by the device over the first period of time, and allocate a third number of calls per unit of time based on the determined proportion or percentage.

22. The device of claim 20, further comprising:

a communication interface configured to:

forward, to the plurality of other devices, information identifying the number of calls received by the device over the first period of time that satisfied the first rule.

23. The device of claim 20, wherein the at least one logic device is further configured to:

dynamically reallocate the portion of the first maximum number of calls per unit of time to the device for subsequent periods of time based on the number of calls received by the device that satisfy the first rule and the number of calls received by the plurality of other devices that satisfy the first rule during subsequent periods of time.

24. A method, comprising:

storing a plurality of rules associated with processing calls, each of the plurality of rules including a maximum number of calls per unit of time;

determining whether the maximum number of calls per unit of time associated with a first one of the plurality of rules is greater than a threshold; and allocating by a first one of a plurality of nodes, when the maximum number of calls per unit of time associated with the first rule is greater than the threshold, a second number of calls per unit of time to the first node based on a third number of calls satisfying the first rule that were received by the first node and a total number of calls satisfying the first rule that were received by all of the plurality of nodes, wherein the second number of calls per unit of time identifies a number of calls per unit of time associated with the first rule that the first node is allowed to forward.

25. The method of claim 24, further comprising:

forwarding, by the first node when the maximum number of calls per unit of time associated with the first rule is less than the threshold, calls received by the first node that satisfy the first rule to a second device; and receiving, from the second device, information indicating whether to forward calls satisfying the first rule or drop calls satisfying the first rule.

* * * * *